Oct. 30, 1962    G. ULMER    3,061,296
BLAST AIR PREHEATING SYSTEM FOR CUPOLA FURNACES AND THE LIKE
Filed June 26, 1959
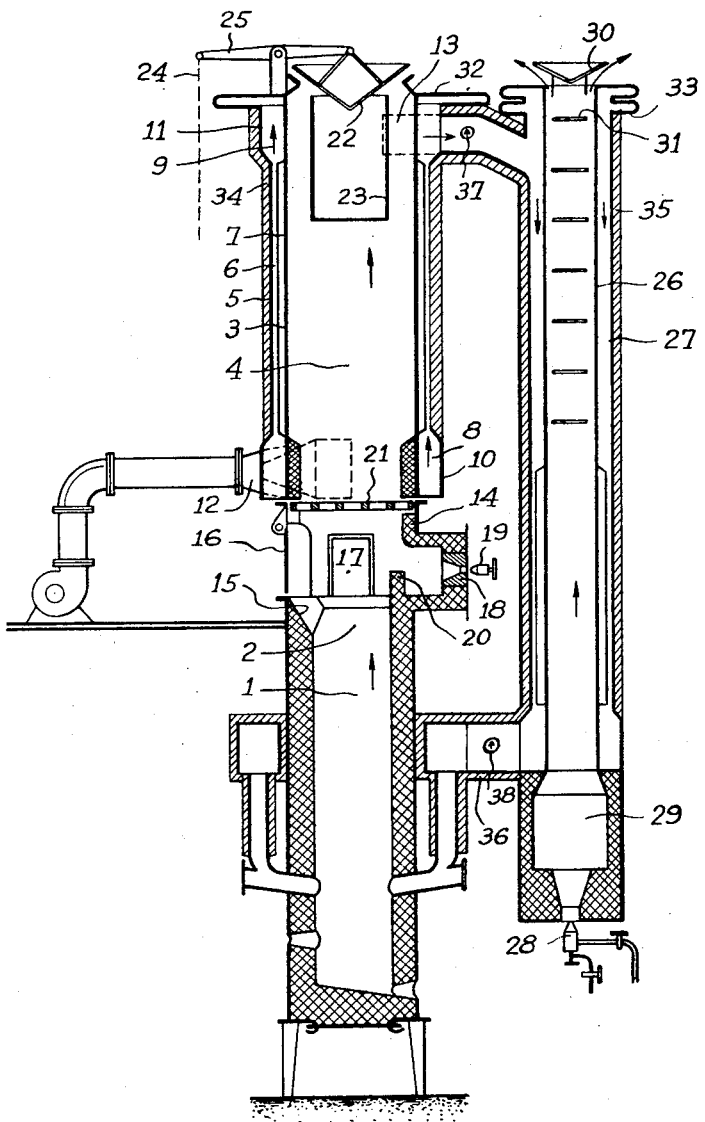

United States Patent Office 3,061,296
Patented Oct. 30, 1962

3,061,296
BLAST AIR PREHEATING SYSTEM FOR CUPOLA FURNACES AND THE LIKE
Georges Ulmer, Paris, France, assignor to Centre Technique des Industries de la Fonderie, Paris, France, a French public utility institute
Filed June 26, 1959, Ser. No. 823,036
Claims priority, application France June 28, 1958
5 Claims. (Cl. 266—14)

This invention relates to blast furnaces, especially of the cupola type, and is concerned with means for preheating the blast air supplied to the furnace.

It is known to associate with a cupola furnace a recuperator assembly topping the furnace and comprising a pair of coaxial vertical shells defining an inner and an outer flow space. The inner flow space communicates with the cupola furnace by way of the top or throat charging opening of the furnace, so as to be traversed in operation by an upflow of furnace gases on their way out to atmosphere. The outer, annular, flow space of the recuperator assembly has an air inlet manifold at one end, connected with a source of compressed air, an air outlet manifold and at its other end from which air is withdrawn after said air has been preheated by heat exchange in the recuperator with the upflowing furnace gases, and this preheated air is then delivered to the conventional furnace blast nozzles. Combustion means may be provided in the case of the inner space of the recuperator to ignite the furnace gases and extract the latent heat therefrom. An adjustable sealing member is associated with the top of the inner recuperator space to adjust the updraft in said space and control the rate of upflow of the gases.

Plant of the character described operates very successfully to preheat the blast air supplied to the furnace to temperatures within a range of 200 to 400° C. by extracting both the sensible and latent residual heat from the furnace gases. However, this range of temperatures is sometimes found insufficient and it would be desirable in many cupola furnace installations to increase the preheating temperature of the blast air. It is one object of this invention to achieve this result without requiring an increase in the actual capacity of the recuperator itself. Another object is to improve the operation of a recuperator assembly of the type specified above and specifically to provide improved means for regulating the temperature at the outlet from the recuperator.

A further object is to provide an improved blast air preheating system for blast furnaces, which will incorporate means providing simple, efficient and flexible means for automatically regulating the blast air temperature within accurate limits thereby reducing servicing requirements to a minimum.

Other objects are to provide structural improvements in a cupola furnace-and-recuperator combination of the type described.

According to one aspect of the invention, there is provided in the above specified combination of a blast or cupola furnace with a recuperator assembly topping said furnace and operative to preheat blast air supplied to said furnace by extracting latent and sensible heat from the furnace gases flowing out to atmosphere through said recuperator, the additional feature that the preheated air from the recuperator is passed, on its way to the blast nozzles of the furnace, through a further heat exchanger assembly, herein called the "superheater" assembly, in which the temperature of the blast air is boosted to a higher level through heat exchange with combustion gases derived from combustion means incorporated in said superheater assembly.

Preferably the superheater assembly likewise comprises a pair of coaxial vertical shells defining an inner and an outer flow space, the preheated air from the recuperator is passed downwards through the outer, annular, one of said spaces to be delivered to the furnace nozzles, and a combustion chamber is provided at the lower end of the inner space of the recuperator and has a burner projecting axially upwards into it to provide an upflow of hot combustion gases in counterflow relationship with the downwardly flowing air.

The boost temperature to which the blast air is thus carried by the superheater assembly is adjustable by adjusting the rate of the superheater burner, so as to maintain the final temperature of the blast air supplied to the furnace in a prescribed range independently of any factors that may affect the operation of the cupola furnace, including charging thereof. Thus, any reduction in the temperature of the furnace gases can be offset by a corresponding increase in the temperature of the combustion gases acting in the superheater. Such regulation can very simply be accomplished by automatic means.

It is found that the increased blast air temperatures provided by the invention are extremely desirable both in connection with small or moderate sized cupola furnaces in which very high temperatures are required, and also for larger furnaces in which the use of a recuperator alone may prove inadequate.

Other advantageous features of the invention relate to the construction of the recuperator and furnace combination and will be described specifically hereinafter and pointed out in the claims.

A preferred embodiment of the invention will now be described with reference to the accompanying drawing, which illustrates in simplified, vertical cross section a plant comprising a cupola furnace, a recuperator assembly topping the furnace, and a superheater assembly interposed in the flowpath of the preheated blast air from the recuperator to the cupola furnace.

As shown in the drawing, a cupola furnace 1 has a top charging opening or throat 2. Mounted on the top of the cupola in vertical coaxial alignment with it is a waste heat recuperator assembly, which comprises a pair of coaxial steel shells, an inner shell 3 and an outer shell 5. The inner shell 3 defines within it an inner flow space 4 for the exhaust gases issuing from the cupola, which gases are burned so as to recuperate their residual latent heat as will be further explained. Between the inner and outer shells 3 and 5 an annular gap 6 of relatively narrow width defines an outer flow space through which the blast furnace air to be preheated is passed.

The inner shell 3 has vertical angle members 7 secured around its inner surface in angularly spaced relation to provide fins increasing the heating surface swept by the hot air, while simultaneously stiffening the shell and imparting adequate rigidity to the structure even at the relatively high temperatures involved. These angles preferably have one of their flanges welded along its end surface to the surface of the inner ring 3, while the other flange of each angle extends parallel to the inner surface of the shell 3. The inner shell 3 is formed with enlarged-diameter end sections 10 and 11 beyond the lower and upper ends of the angle members 7, respectively, so as to define a pair of annular headers or manifolds, namely the bottom air inlet manifold 8 for feeding the cool air into the annular space 6, and the top air outlet manifold 9 for collecting the preheated air at the top of said space.

Connecting tangentially with the inlet manifold 8 are one or more air inlet conduits 12, and connecting tangentially with the outlet manifold 9 are one or more outlet conduits 13. It will be noted that both the primary flow of heating gases and secondary flow of air to be heated both occur in a common direction, i.e. upward as indicated by the arrows.

The recuperator structure thus described is connected at its lower end with the top of the cupola by way of an intermediate shell 14 provided with a refractory lining as shown, and defining a precombustion chamber for the recuperator. The intermediate shell 14 is provided with a refractory lining as shown, and defining a precombustion chamber for the recuperator. The intermediate shell 14 is formed with a charging chute 15 for charging the cupola and is fitted with a hinged door 16 normally closing the charging orifice. The intermediate shell further comprises a side air intake valve 17, and a channel 18 for a pilot burner 19. The burner channel 18 and burner 19 may be disposed with their axes radial to the axis of the furnace assembly, or more or less tangential thereto if preferred. A protecting wall or baffle 20 is provided in front of the burner assembly and spaced therefrom within the intermediate shell 14.

As will be noted from the drawing, the inlet manifold 8 of the recuperator has an internal refractory lining formed as an upward extension of that of the intermediate chamber 14.

Between the top of the intermediate chamber and the bottom end of the recuperator there is interposed a horizontal grating 21 which serves to increase the turbulence in the gases and improve the mixing thereof, and to stabilize the flame front.

Supported at the top of the recuperator is a sealing assembly which comprises a bell 22 in the form of an inverted cone from which a cylindrical shell 23 is suspended coaxially with the inner shell 3 and spaced inwardly therefrom. Instead of a continuous shell 23 an annular set of hanging chains may be used. The cone 22 is suspended from one end of a two-armed lever 25 and its vertical position is controllable by way of a chain 24 attached to the opposite arm of the lever and connected with any suitable operating means, manual or preferably automatic.

Connected with the outlet conduit or conduits 13 of the recuperator is a superheater assembly now to be described. This assembly also comprises a pair of coaxial vertical steel shells including the inner shell 26 and outer shell 27. Up the inner flow space defined within the inner shell 26 a blast of hot gases is discharged from a burner 28 positioned at the lower end of the superheater and discharging into a combustion chamber 29 formed in said lower end of the inner superheater shell 26. Down the annular or outer flow space between the inner and outer shells 26 and 27 flows the preheated air issuing by way of connector conduit from the recuperator. It will thus be seen that in the superheater structure a counterflow relationship is present between the heating gases and the air to be superheated.

The heating gases flowing up through the superheater are discharged directly to atmosphere through a passage defined at the top of the inner superheater shell 26 by a sealing member 30 in the form of an inverted cone, adjustable in position when starting up the installation so as to provide a suitable natural draft through the inner shell 26 and so that a suitable rate of suction of combustion gases is provided into the chamber 29 around the burner 28.

A plurality of vertically spaced discs 31 of refractory steel may be suspended from the sealing member 30, through means not shown, within the inner shell 26 in order to increase the rate of thermal exchange.

The lower end of the annular space between the inner and outer superheater shells 26 and 27 is connected by way of a conduit 36 with an annular manifold or windbox surrounding the cupola furnace body and connected in turn by way of descending vertical conduits to the conventional air-blast nozzles delivering into the furnace, as shown.

To complete the installation there are provided conventional expansion joints 32 and 33 at the top of the recuperator and the superheater respectively, heat lagging such as 34 and 35 around the outer surfaces of the recuperator and superheater respectively, and a pair of pyrometers or temperature-responsive units 37 and 38 for inspecting the blast air temperatures at the input and output of the superheater. The operation of the system will first be described disregarding the superheater or temperature-booster assembly.

In operation, the pilot burner 19 is ignited simultaneously with the cupola to preheat the recuperator while building up the bed of ignited coke (or other fuel used) required before the actual melting process can commence; the air blast is discharged through the inlet 12, and cycles through the flow circuit described, heating up the gases in the cupola, which take on an increasing concentration of carbon oxide, until said gases are finally ignited at the throat of the cupola by the burner 19.

At this point the position of recuperator seal 22 is adjusted so as to obtain a stable flame while at the same time avoiding a backflow of the combustion gases into the cupola throat.

A period of time on the order of half an hour from the time the air blast is started is required to bring the recuperator to its proper operating temperature. When this stable condition has been reached, the temperature of the air blast is adjusted to its desired value by observing the indications of pyrometer 37. It will be observed that the up-and-down adjustment of seal 22 can very simply be done in an automatic way, through servo-mechanism responsive to temperature-sensing unit 37. In so doing the seal 22 is lowered to a more fully closed position in order to increase the blast temperature, and is raised to reduce said temperature. It is noted in this connection that a substantially constant relationship or ratio is present at all times between the temperature of the heated air discharged and the temperature of the gases in the recuperator. This ratio or relationship substantially corresponds to the thermal efficiency ratio, since the rates of flow of the air and combustion gases respectively are approximately the same. Now, when the seal 22 is lowered, the draft and air suction rate are reduced, so that the dilution of the gases is reduced and the combustion temperature is raised, correspondingly increasing the temperature of the air blast to be heated.

The additional air inlet valve door 17 may be partially opened in the event that the combustion is found to proceed unsatisfactorily when the seal 22 is moved to a more closed position, before a backflow of the gases sets in as the upper limit of recuperator performance is approached. Such defective combustion may occur due to an inadequate supply of combustion air for the gases in the recuperator, due to the presence of too perfect an airtight seal at the throat of the blast furnace, e.g. at the charging door 16. In such cases partial opening of the valve 17 will remedy this condition.

During the melting run, gas combustion proceeds under natural draft conditions in the recuperator without requiring any other servicing beyond inspection of the pyrometer 37 and from time to time adjusting the position of seal 22 accordingly to maintain the blast temperature between the prescribed limits. Preferably however such regulation is effected automatically through any conventional servo regulating means as already indicated.

After every charging operation when a charge of metal and/or coke is added into the furnace, the gases are reignited by the pilot burner.

At the end of the melting run, as the temperature of the exhaust gases at the furnace throat rises considerably since it is no longer moderated by flow through the cool charges in the furnace, the seal 22 and valve 17 are moved to fully open positions, so as to let in a maximum amount of cool air to the base of the recuperator and prevent excessive heating.

As regards the operation of the superheater section of the system, the burner 28 is ignited simultaneously with the furnace and the pilot burner 19. The burner 28 is adjusted to its maximum setting in order to warm up the superheater rapidly and provide a high-temperature air blast from the very outset of the run. After stable operating conditions have been reached both in the furnace and recuperator, the output of burner 28 is adjusted until the desired air blast temperature has been obtained, as indicated by the pyrometer 38. Such adjustments may be effected manually, or more preferably through automatic means. In the latter case the temperature-sensing unit 38 may be made to act upon the setting of burner 28 either on an "all or nothing" or an "all or little" basis, in order to maintain the superheated air blast temperature substantially constant. Adjustment of the superheater burner supplements the adjustment of the recuperator burner, and the over-all regulation is greatly improved since the independent superheater is fully able to accommodate variations in the operating rates of operation of the furnace, whereas the recuperator obviously is unable to do so. The flexibility and efficiency of the plant operation are thus considerably improved.

It will be understood that various changes in design may be made and departures from the structural details of the single embodiment illustrated may be made without exceeding the scope of the ensuing claims.

What I claim is:

1. The combination of a cupola type blast furnace having a top charging throat and tuyeres adjacent its lower end for admitting hot air blasts to the furnace, a waste heat recuperator and air preheater disposed above said throat and having vertical inner and outer jackets defining inner and outer spaces separated by said inner jacket, connecting means between the bottom end of one of said spaces and said throat of the furnace so that waste gases from the latter flow upwardly through said one space, means for admitting air to be preheated to the bottom of the other of said spaces so that the air flows upwardly through said other space and is preheated by heat transfer from the waste gases flowing in said one space, a pilot burner in said connecting means for initially heating the gases flowing upwardly through said one space of the recuperator and air preheater, an exhaust opening at the top of said one space of the recuperator and air preheater for discharging said waste gases from the frunace, a movable closure in said exhaust opening at the top end of said one space for regulating the draft through the latter, a superheater having inner and outer jackets defining inner and outer passages separated by said inner jacket of the superheater, means connecting the opposite ends of one of said passages to the upper end of said other space of the recuperator and air preheater and to said tuyeres, respectively, a source of hot gases independent of said furnace, and means delivering hot gases only from said source independent of the furnace to an end of the other of said passages for flow through said other passage to further heat the preheated air prior to delivery of the latter from said one passage to said tuyeres.

2. The combination as in claim 1; wherein said source of hot gases independent of the furnace includes a combustion chamber opening into said end of the other passage and a burner in said combustion chamber.

3. The combination of a cupola type blast furnace having a top charging throat, a waste heat recuperator and air preheater disposed above said throat and having vertical inner and outer jackets defining inner and outer spaces separated by said inner jacket, connecting means between the bottom end of one of said spaces and said throat of the furnace so that waste gases from the latter flow upwardly through said one space, a pilot burner in said connecting means, said connecting means defining a precombustion chamber for the recuperator and preheater and having a charging door through which charges can be fed to said throat of the furnace, said connecting means further having a regulatable air intake valve, a grating at the bottom of said one space effective to increases the turbulence and mixing of the gases flowing upwardly through said connecting means from said throat into said one space, a movable closure at the top of said one space for regulating the draft through the latter so that a high velocity of air entry can be obtained through said air intake valve of said connecting means for ensuring thorough mixing of the entering air with said waste gases from the furnace, a heat radiating shell suspended from said closure in said one space, and means for admitting air to the lower end of the other of said spaces for upward flow therethrough during which the air is preheated by heat transfer from the gases flowing in said one space.

4. The combination as in claim 3; further comprising a refractory baffle wall in said precombustion chamber in a position to be impinged against by flame from said pilot burner.

5. The combination as in claim 3; wherein said means for admitting air to the lower end of said other space includes an annular air inlet manifold at said lower end of the other space and overlying said precombustion chamber; and further comprising a refractory lining extending over a major portion of the inner surface of said precombustion chamber and the inner surface of said annular air inlet manifold.

References Cited in the file of this patent

UNITED STATES PATENTS

| 1,090,574 | Shannon | Mar. 17, 1914 |
| 1,376,479 | Stoughton | May 3, 1921 |
| 1,694,376 | Day et al. | Dec. 11, 1928 |
| 1,704,029 | Baily | Mar. 5, 1929 |
| 1,740,886 | Barr et al. | Dec. 24, 1929 |
| 1,773,705 | Doran | Aug. 19, 1930 |
| 2,817,508 | Schwengel | Dec. 24, 1957 |
| 2,865,734 | Klemantaski | Dec. 23, 1958 |

FOREIGN PATENTS

| 1,129,054 | France | Jan. 15, 1957 |
| 768,365 | Great Britain | Feb. 13, 1957 |